US008032553B2

(12) United States Patent
Lippe et al.

(10) Patent No.: US 8,032,553 B2
(45) Date of Patent: Oct. 4, 2011

(54) EMAIL INTEGRATED TASK PROCESSOR

(75) Inventors: Sonia Lippe, West End (AU); Dominic Yow-Sin-Cheung, Heidelberg (DE)

(73) Assignee: SAP AG, Walldorf (DE)

(*) Notice: Subject to any disclaimer, the term of this patent is extended or adjusted under 35 U.S.C. 154(b) by 676 days.

(21) Appl. No.: 11/025,284

(22) Filed: Dec. 29, 2004

(65) Prior Publication Data

US 2006/0143613 A1 Jun. 29, 2006

(51) Int. Cl.
G06F 7/00 (2006.01)
G06F 17/30 (2006.01)
(52) U.S. Cl. ......... 707/781; 709/201; 709/203; 715/752
(58) Field of Classification Search .................. 718/100; 707/3–5, 600–899, 999.001–999.206; 705/9
See application file for complete search history.

(56) References Cited

U.S. PATENT DOCUMENTS

| | | | | |
|---|---|---|---|---|
| 5,826,269 A * | 10/1998 | Hussey | ............................ | 707/10 |
| 5,917,489 A * | 6/1999 | Thurlow et al. | .............. | 715/809 |
| 5,960,406 A * | 9/1999 | Rasansky et al. | .................. | 705/9 |
| 6,057,841 A * | 5/2000 | Thurlow et al. | ............... | 715/809 |
| 6,134,582 A * | 10/2000 | Kennedy | ....................... | 709/206 |
| 6,230,156 B1 * | 5/2001 | Hussey | ............................ | 707/10 |
| 6,311,211 B1 * | 10/2001 | Shaw et al. | .................... | 709/206 |
| 6,330,589 B1 * | 12/2001 | Kennedy | ....................... | 709/206 |
| 6,363,352 B1 * | 3/2002 | Dailey et al. | ....................... | 705/9 |
| 6,480,830 B1 * | 11/2002 | Ford et al. | ........................... | 705/9 |
| 6,505,167 B1 * | 1/2003 | Horvitz et al. | .................... | 705/9 |
| 6,549,916 B1 * | 4/2003 | Sedlar | ................................. | 1/1 |
| 6,606,642 B2 * | 8/2003 | Ambler et al. | ................ | 709/200 |
| 6,640,230 B1 * | 10/2003 | Doss et al. | ....................... | 707/10 |
| 6,708,202 B1 * | 3/2004 | Shuman et al. | ............... | 709/206 |
| 7,089,287 B2 * | 8/2006 | Bellotti et al. | ................ | 709/206 |
| 7,269,621 B2 * | 9/2007 | Chang et al. | ................... | 709/203 |
| 2001/0005855 A1 * | 6/2001 | Shaw et al. | ..................... | 709/206 |
| 2002/0016729 A1 * | 2/2002 | Breitenbach et al. | ............. | 705/9 |
| 2002/0052921 A1 * | 5/2002 | Morkel | .......................... | 709/206 |
| 2002/0099777 A1 * | 7/2002 | Gupta et al. | .................... | 709/206 |
| 2002/0111989 A1 * | 8/2002 | Ambler et al. | ................. | 709/202 |
| 2002/0143964 A1 * | 10/2002 | Guo et al. | ...................... | 709/229 |
| 2002/0165732 A1 * | 11/2002 | Ezzeddine et al. | ................ | 705/2 |
| 2003/0023675 A1 * | 1/2003 | Ouchi et al. | ................... | 709/203 |
| 2003/0135558 A1 * | 7/2003 | Bellotti et al. | ................ | 709/206 |
| 2003/0154254 A1 * | 8/2003 | Awasthi | ........................ | 709/206 |
| 2003/0171971 A1 * | 9/2003 | Lovekin et al. | .................... | 705/9 |
| 2004/0039626 A1 * | 2/2004 | Voorhees | .......................... | 705/9 |
| 2004/0122730 A1 * | 6/2004 | Tucciarone et al. | ............ | 705/14 |
| 2004/0133520 A1 * | 7/2004 | Callas et al. | .................... | 705/51 |

(Continued)

OTHER PUBLICATIONS http://support.microsoft.com/kb/196212—This is a Microsoft Knowledge Base article, p. 1-3 (Microsoft Outlook 2000).*

(Continued)

*Primary Examiner* — Vincent Boccio
*Assistant Examiner* — Angelica Ruiz
(74) *Attorney, Agent, or Firm* — Schwegman, Lundberg & Woessner, P.A.

(57) ABSTRACT

The present system provides a task manager that extracts information relating to tasks from a task oriented email. The system then integrates the task within the system by connecting the email programs, the task management programs, and a database, to automatically send emails and provide links to documents all related to completion of the task. Methods are provided that allow users of the system to efficiently interface with the system to complete and archive tasks.

19 Claims, 11 Drawing Sheets

U.S. PATENT DOCUMENTS

| | | | |
|---|---|---|---|
| 2004/0183829 A1* | 9/2004 | Kontny et al. | 345/751 |
| 2004/0249801 A1* | 12/2004 | Kapur | 707/3 |
| 2005/0097440 A1* | 5/2005 | Lusk et al. | 715/500.1 |
| 2005/0138631 A1* | 6/2005 | Bellotti et al. | 719/310 |
| 2005/0160107 A1* | 7/2005 | Liang | 707/100 |
| 2005/0182773 A1* | 8/2005 | Feinsmith | 707/100 |
| 2005/0192822 A1* | 9/2005 | Hartenstein et al. | 705/1 |
| 2005/0202846 A1* | 9/2005 | Glass et al. | 455/557 |
| 2006/0031311 A1* | 2/2006 | Whitney et al. | 709/206 |
| 2006/0031320 A1* | 2/2006 | Holloway et al. | 709/206 |
| 2006/0101115 A1* | 5/2006 | Gleckman | 709/203 |
| 2006/0168040 A1* | 7/2006 | Kushmerick et al. | 709/206 |
| 2006/0277205 A1* | 12/2006 | Song et al. | 707/102 |
| 2007/0016647 A1* | 1/2007 | Gupta et al. | 709/206 |
| 2008/0270491 A1* | 10/2008 | Nowacki et al. | 707/204 |

OTHER PUBLICATIONS

Kerr, Designing Remail: Reinventing the Email Client Through Innovation and Integration, Apr. 2004, ACM, pp. 837-852.*

Esther Dyson, "Meta-Mail: A medium for Meaning" vol. 22, Jun. 2004, pp. 1-40.*

* cited by examiner

PROJECT QUARTERLY REPORT
RESPONSIBLE: FRED
REPORTED TO: SENDER
CC TO: CC LIST

DEADLINE: AUGUST 31, 2004

☐ NEED QUARTERLY REPORT ASAP
FRED: I NEED A DRAFT OF THE QUARTERLY REPORT NO LATER THAN FRIDAY AUGUST 31.

| | |
|---|---|
| PROJECT QUARTERLY REPORT<br>RESPONSIBLE: FRED<br>REPORT TO: SENDER<br>CC TO: JIM, SALLY, SUE | DEADLINE: AUGUST 31, 2004 |
| TARGET: AUGUST 15, 2004 | |
| | [E] NEED QUARTERLY REPORT ASAP<br>[I] QUARTERLY REPORT TEMPLATE<br>[O] QUARTERLY REPORT VID<br>[D] EXPENSE REPORT 2Q 2004 |

EMAIL INTEGRATED TASK PROCESSOR

BACKGROUND

The present invention is related to email and task processing, and more particularly to providing fully integrated and expanded email and task management system and methods.

Different varieties of task management systems and email software programs are used in office environments. Email programs provide communications between workers while task management programs allow individual workers to manage their assigned tasks. Even if both types of programs are contained in one software package, they are disjointed and do not offer a sufficiently integrated functionality.

Tasks to be completed are often not explicitly sent out or specified as tasks, but are received as part of an email and new tasks are then created manually in a task management system by a worker. Task fulfillment often requires information received in additional emails or might be impacted by the information in incoming emails. In complex tasks, often more than one email is relevant and has to be considered when executing a task.

For the person working on a task many problems commonly arise. If tasks are kept independently of emails, the user has to manually search for and open all related emails whenever working on a task. Relevant information is easy to be missed. Email programs do not provide functionality such as internally linking emails that relate to one task to be accessed in the task management system. Updates on a task that are sent out via email might not be considered or recognized as relevant by a task management system.

Usually to fulfill a task, several documents (emails, web pages, files, etc,) are required. These documents are often collected and opened by the user fulfilling the task every time the individual works on it. Attachments to tasks in MS Outlook for example are possible, but these are local documents. If changes are made to the original documents, they are not updated globally so other individuals are not aware of the current status of the task.

When a task is completed, often participants that should receive a notification are missed or documents are not attached. Finally, archiving of completed tasks is not often done or does not include all the necessary documents.

Therefore existing email and task management programs do not provide adequate solutions and integrations for today's office environment.

SUMMARY OF THE INVENTION

Embodiments of the present system provide a task manager that extracts information relating to tasks from a task oriented email. The exemplary task manager uses the extracted information along with an email program and a database to provide features such as automatically sending task related emails, and a linking of relevant emails into the task management system and searching for related emails. The exemplary embodiments further provide shortcuts (instead of attachments) to relevant documents and emails in a task management program, and provide a semi-automatic creation of a response after task fulfillment, that suggests possible attachments as well as possible receivers and finally provides an archiving of tasks and all relevant documents as one file.

The various exemplary processes and methods provided herein are enabled and enacted by a processor, an email program, a database memory and a task manager. Further, in other exemplary embodiments, the algorithms and methods described are contained in programming code segments that enable the processes to be used in computer environments.

It will be appreciated that the present invention is described below using specific examples that are not intended to limit the invention. The systems and methodology may be applied to a broad range of other computer applications. Therefore these and other advantages of the present invention will become apparent to those skilled in the art upon a reading of the following detailed description and a study of the drawing figures.

DETAILED DESCRIPTION OF THE PREFERRED EMBODIMENT(S)

Various exemplary embodiments of the present system and methods are described below with reference to FIGS. 1-11. The present system provides a task manager that extracts information relating to tasks from a task oriented email. Various exemplary algorithms are enacted by the task management system to provide features such as a semi-automated task extraction out of emails, populating the task management software with the information from the email, selecting specific parts of the email as tasks properties (e.g. subject, due date, method of work, required information etc.), linking relevant emails into the task management system and searching for related emails to the task.

The various embodiments of the present system further provide shortcuts to relevant documents and emails in the task management program, and also provide an archiving of tasks and all relevant documents as one file, which enhances the task completion process.

Figure 1:
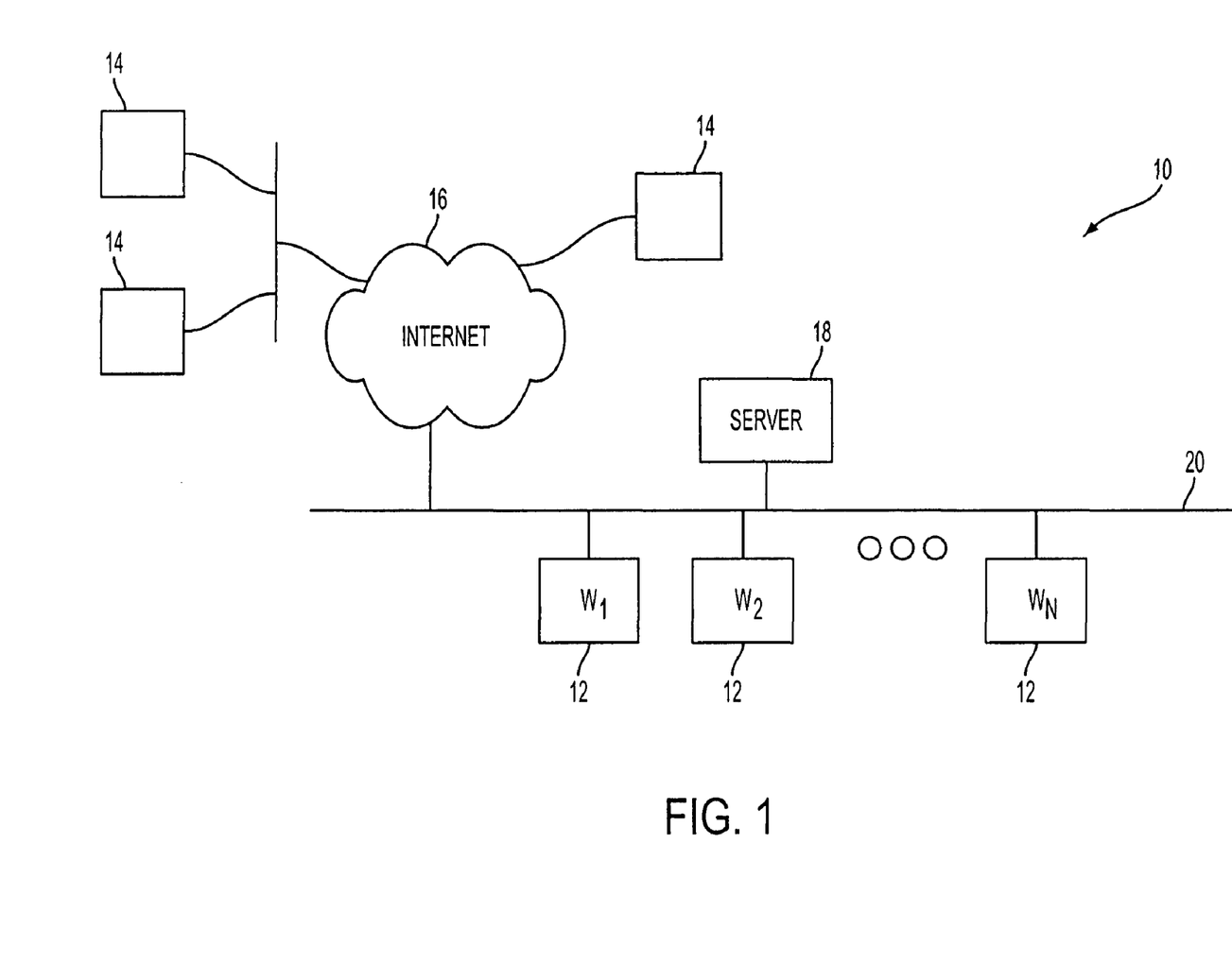
FIG. 1 shows a diagram of a computer work station system.

FIG. 1 is a diagram of the email integrated task processing system 10 of an embodiment of the present invention. The exemplary system 10 includes a number of workstation computers 12, a number of remote workstations 14 connected via the Internet 16, and a server 18. A data bus 20 interconnects all the components of the system 10. The computer workstations 12 preferably includes standard features such as a monitor (aka "screen" or "display") for viewing data, a keyboard and mouse or the like for entering data, and a computer unit including, for example a microprocessor. The computer work stations 12 contain application software such as email, workflow, and task management programs. These features of the individual workstation are shown in more detail in FIG. 11.

The embodiments of the system as described herein would therefore be controlled by programmed computer code segments to perform the functions and operations as described with reference to FIGS. 1-11. The processes and methods described herein are set forth as a series of modules that are enacted and enabled by the exemplary computer apparatus including a task manager as described in FIG. 11. It is also noted that the modules may be enacted in a parallel (simultaneously) or serial (one at a time) manner, and further that feasible additional methods may be comprised of a plurality of modules taken from the numerous figures or further methods may be formed using only selected modules within a given process.

Figure 2:
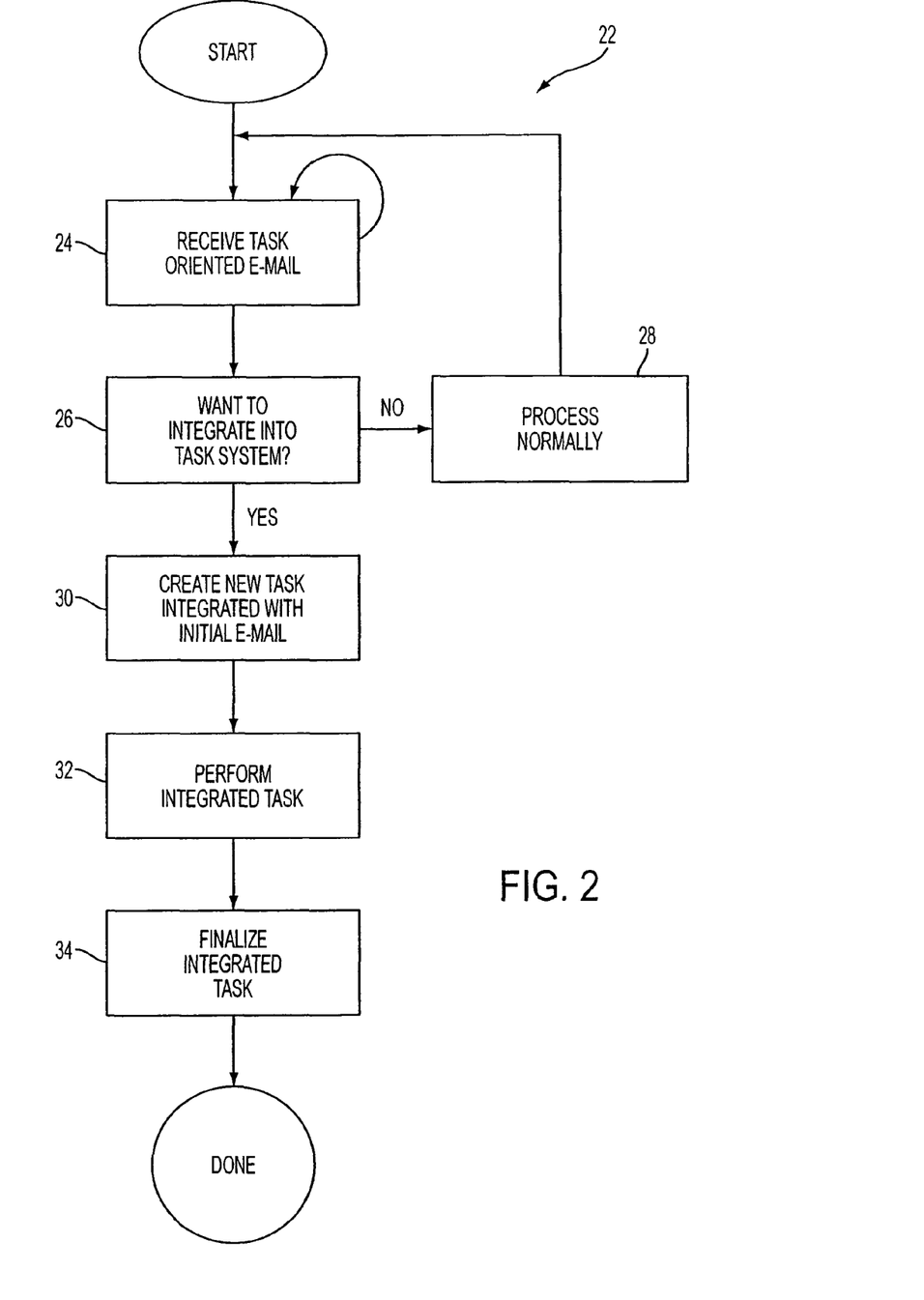
FIG. 2 illustrates an exemplary method of receiving a task oriented email in one embodiment of the present system.

FIG. 2 is a flow diagram illustrating the steps in an exemplary process 22 enacted by the present system. The worker or user interacts with the system through computer workstation 12 as in FIG. 1. After starting, the process 22 enacts module 24 where a task oriented email is received by the system. In module 26 the user is queried if they want to integrate the email into the task system. If the answer is NO, module 28 processes the email normally. If the answer is YES in module 26, the process enacts module 30 where a new task is integrated with the new email. Module 30 is shown in more detail in FIG. 3. In module 32 the integrated task is performed. In module 34 the task is finalized. Modules 32 and 34 are shown in greater detail in FIG. 5. The details of the above process 22, are subsequently described.

Figure 3:
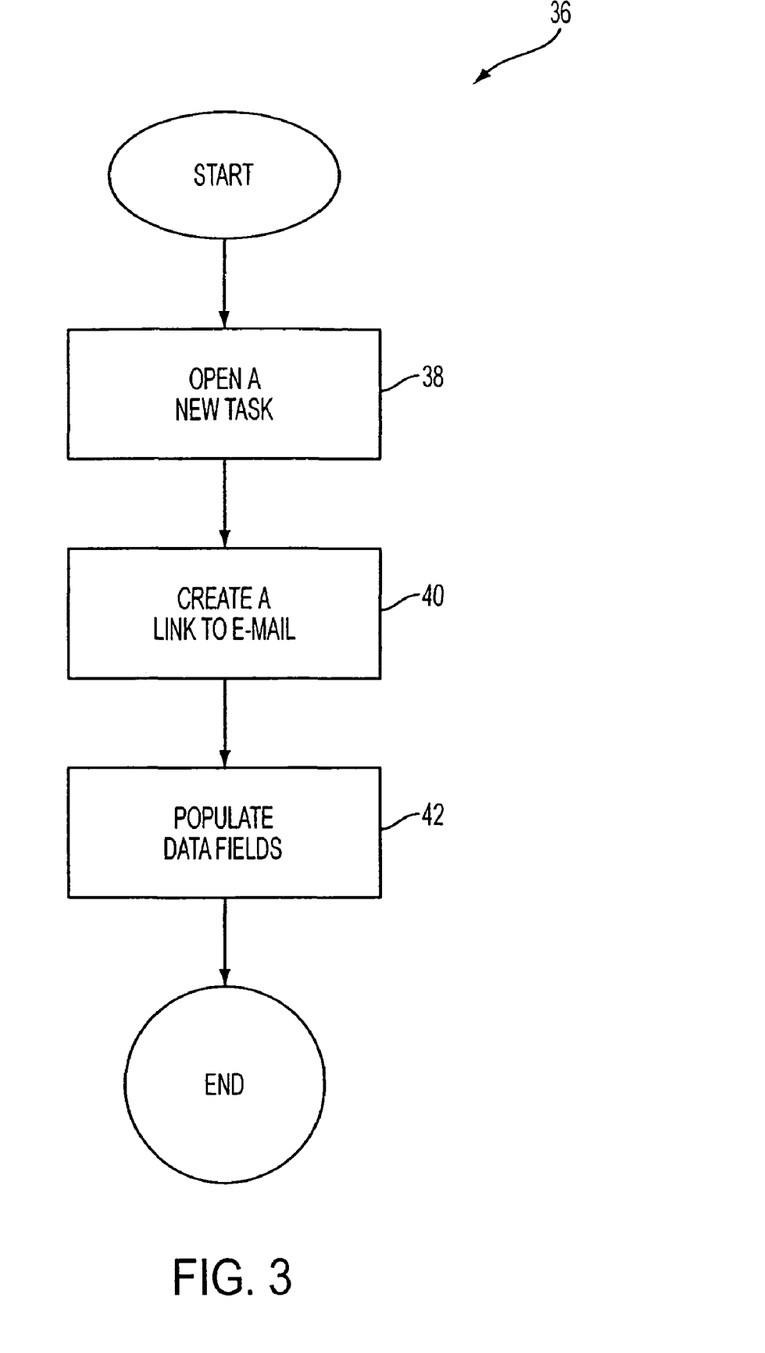
FIG. 3 illustrates an exemplary method of processing a task oriented email in one embodiment of the present system.

FIG. 3 is a flow diagram illustrating in greater detail, the steps 36 enacted in the exemplary process module 30 as shown in FIG. 2. After starting, this exemplary algorithm enacts module 38 to open a new task. In module 40 the system creates a link to email. In module 42 the data fields in a database are populated. In this manner, the initial email and the associated task are integrated into the system. These processes of email integration are performed in the system by a processor and task manager as described below.

Figure 4:
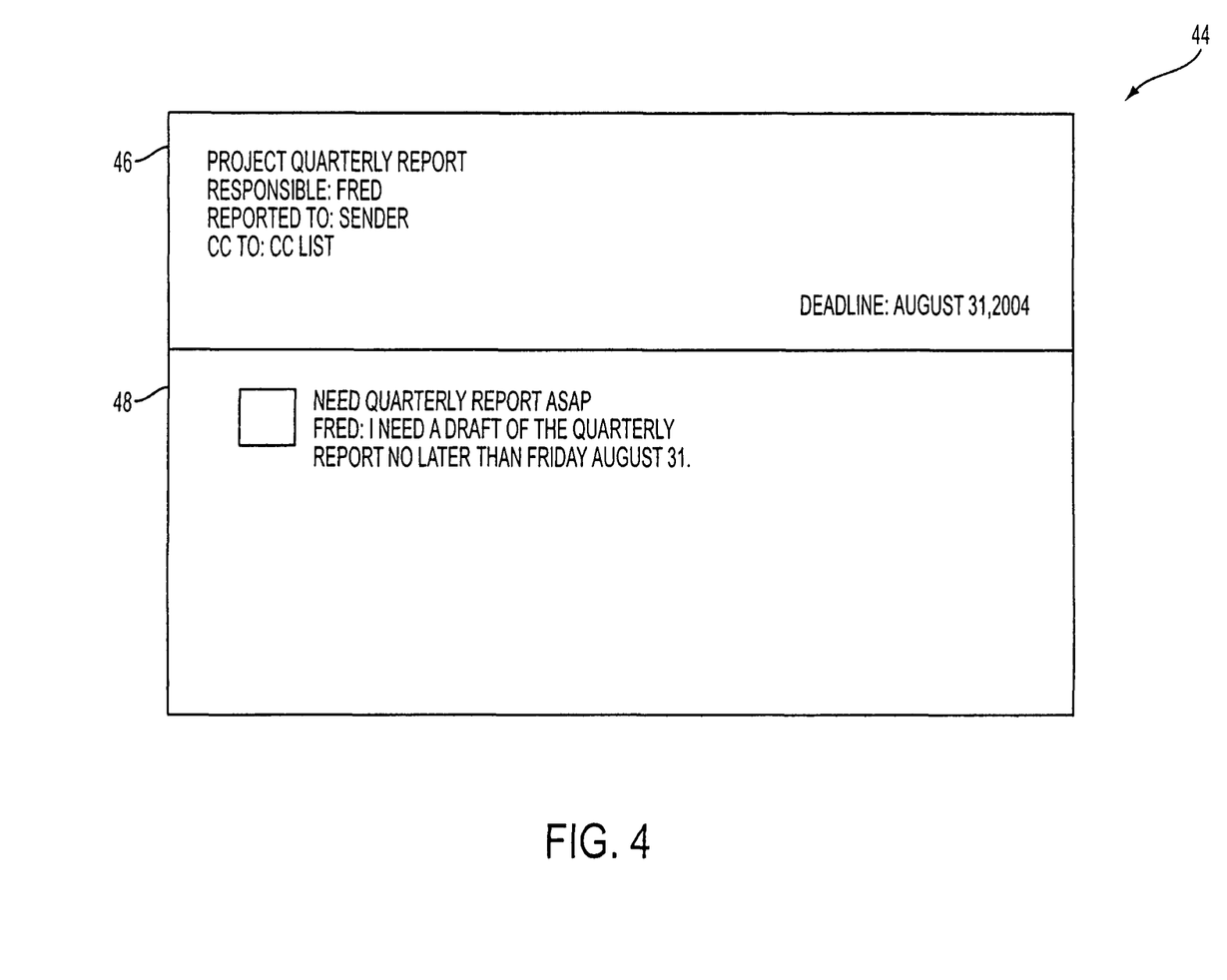
FIG. 4 is a screen shot illustrating a task oriented email within an embodiment of the present system.

FIG. 4 shows a screen shot 44 illustrating an example of an initial task oriented email that has been be integrated into the embodiments of the present system that has been processed by modules 40 and 42 as described with reference to FIG. 3. By screen-shot is meant that the figure depicts the information displayed on computer screen or monitor as would be provided in computer workstations 12, and as subsequently described in FIG. 11. Information 46 in the email 44 contains the name of the project or task, and in this example, the project is a "Quarterly Report". The responsible party is "Fred", and the email also contains a cc list and a person to report to, in this case the "sender" of the email. Message information 48 contained in the email includes a text message "Fred: I need a draft of the quarterly report no later than Friday August 31." This exemplary email 44 therefore provides links to pertinent information and documents, a deadline, a task for completion, and numerous parties associated with the task. Further, the information relating to the task has been populated into the appropriate data fields within the system for additional emailing, document/data processing and task updates as required.

Figure 5:
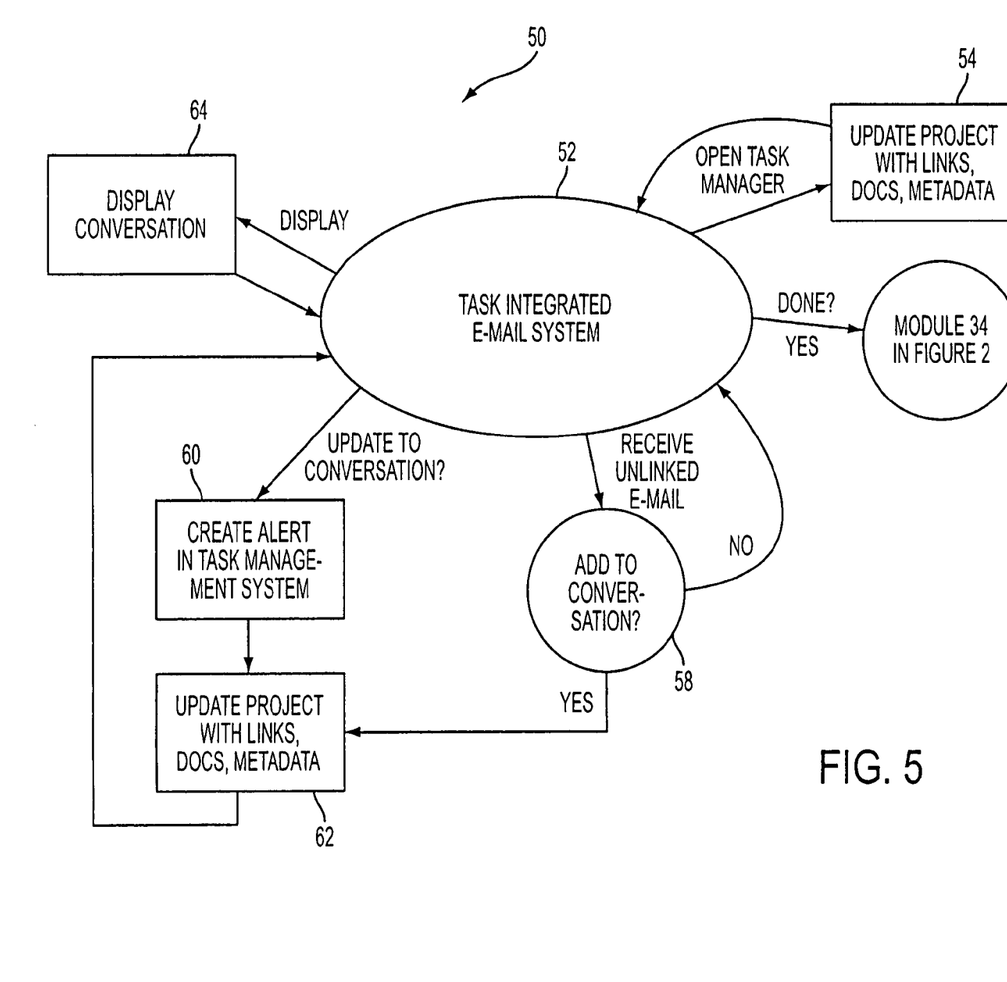
FIG. 5 illustrates an exemplary method of receiving and processing a task oriented email in an embodiment of the present system.

FIG. 5 is a flow diagram illustrating an exemplary process 50 enacted in the exemplary process module 32 as shown in FIG. 2. This process 50 starts in module 52 where the system receives a task oriented email. In module 54 the system updates the project with links, documents and metadata when the task manager is opened. Using the example of FIG. 4, a link to documents may include a shortcut to a template of a standard quarterly report form. If the project is done, module 56 enacts module 34 in FIG. 2, which finalizes the task. When the system receives an unlinked email, module 58 is enacted where the user is queried whether or not to add the email to the existing conversation. If NO, the process returns to module 52. If the answer is YES in module 58, module 62 is enacted where the project is updated with links, documents and metadata. When an update to the conversation is necessary, module 60 is enacted and an alert is created in the task management system and then module 62 is enacted where the project is updated with links, documents and metadata. In module 64 the conversation is displayed. In this manner the task integrating system receives a variety of inputs, both from a user of the system and some provided automatically, to process and integrate information.

Figure 6:
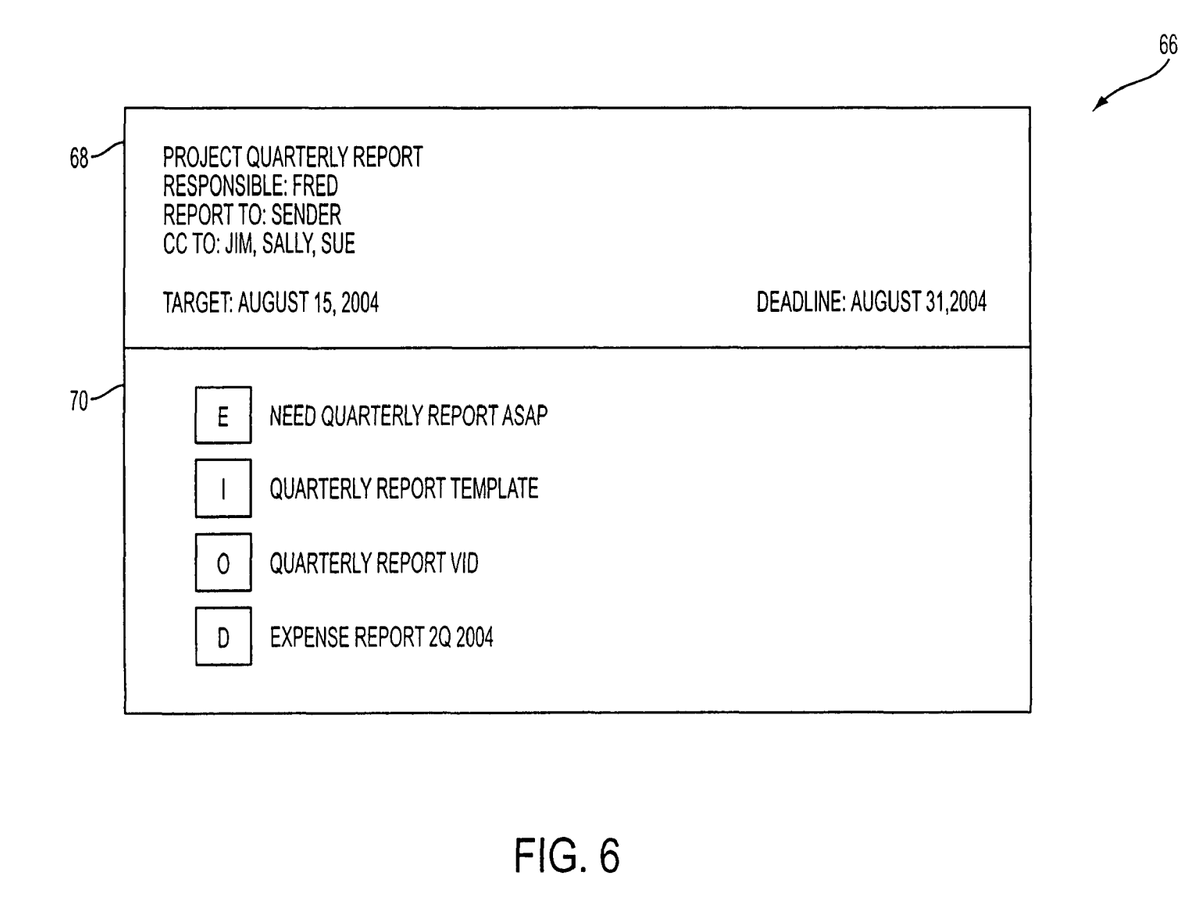
FIG. 6 is a screen shot illustrating a task oriented email processed by an embodiment of the present system.

FIG. 6 shows a screen shot 66 illustrating an example of a task oriented email that has been integrated and processed by an embodiment of the present system. This email 66 is a subsequent email generated from the initial email 44 as shown in FIG. 4, and that has been processed by modules 54 and 62 as described with reference to FIG. 5. In this example, information 68 contains the name of the project or task, the "Quarterly Report", and the responsible party is "Fred". The email also contains a cc list of Jim, Sally, and Sue, and a person to report to, in this case the "sender" of the email. Message information 70 contained in the email 66 includes text messages and links to documents that are relevant to the task of completing a quarterly report. In this example a quarterly report template, a quarterly report VID, and an expense report for the second quarter of 2004. A worker or user of the system may click on any of the links and access and update a current version of these relevant documents. This exemplary automatic email processing and integrating greatly enhances the task completion process for a plurality of workers.

Figure 7:
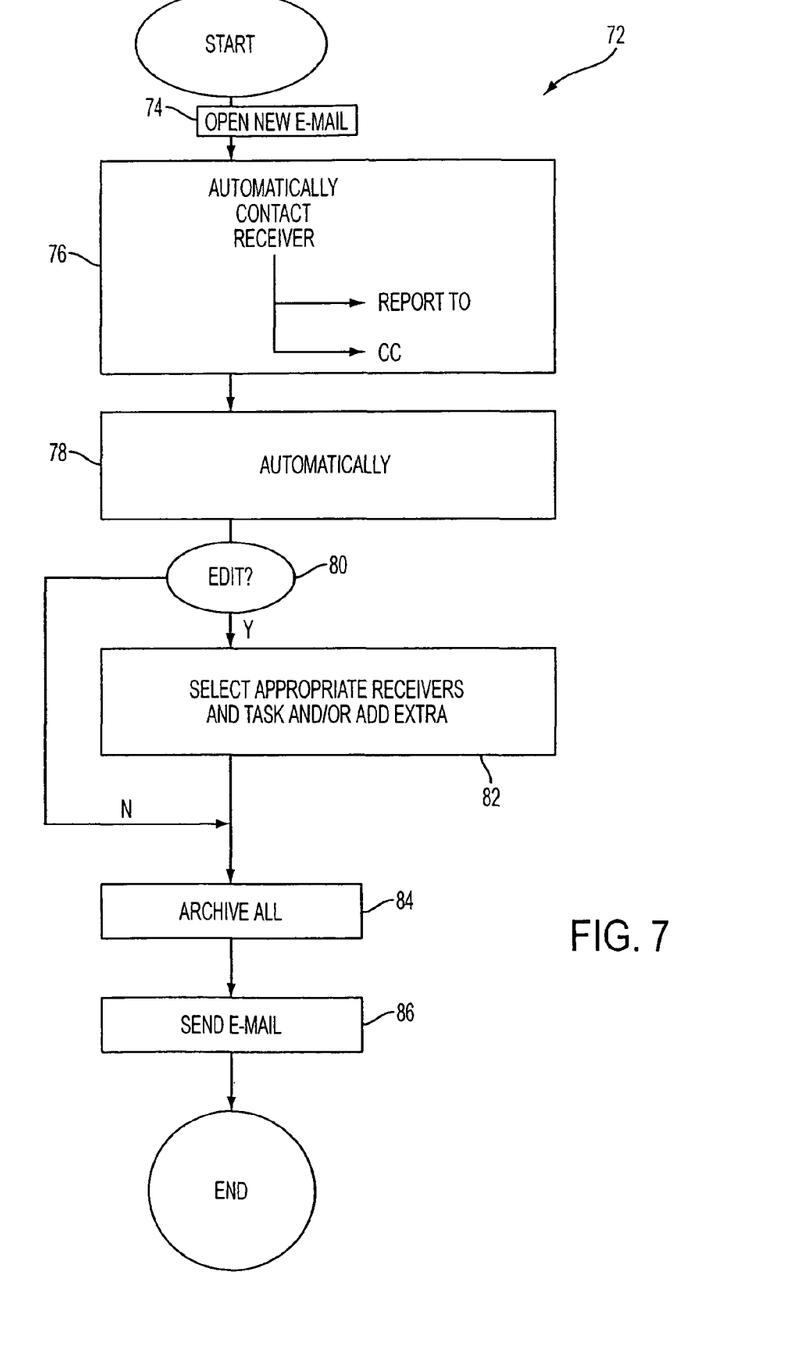
FIG. 7 illustrates an exemplary method of receiving and processing a task oriented email in another embodiment of the present invention.

FIG. 7 is a flow diagram illustrating an exemplary process 72 enacted by the present system in process module 34 as shown in FIG. 2. This exemplary algorithm 72 starts in module 74 where a new email is opened. In module 76 the involved parties are automatically contacted by the system via email. In module 78 the system automatically extracts task information from the email and populates the database within the system and further provides links to these documents. In module 80 a system user is queried to edit the task oriented email. If the answer is YES in module 80, module 82 is enacted where the appropriate receivers and tasks are selected and added to the email. If the answer is NO in module 80, module 84 is enacted where the email/task is archived. In module 86 an email is sent to the relevant parties associated with the task. This process provides an automatic update of tasks and documents to all associated parties.

The following exemplary scenario is used to provide an example of the features provided by an embodiment of the email integrated task processor system. In this example, the task of creating a quarterly project report is used. First, a project manager receives an email from the project office, informing him that the quarterly project report is due and has to be completed in the next four days. He remembers from the last report that there was a template he was supposed to use and sends an email back, requesting this template. The response email contains the template as an attachment, which he saves on this hard disk. To specify the project progress and upcoming issues, he needs additional information which he gets in related documents, like meeting minutes, work documents, deliverables, planning documents, etc. Furthermore he might send out related emails, requesting additional information, from project members about the project. Once he has collected all required information, he will start working on the project report. While he is working on the report, the project office decides on including an additional paragraph into the report template and sends an updated via email. The project manager receives that update, saves it on a hard disc and considers it in his report. Once the report is completed, it is sent out by the project manager. This scenario is subsequently described below with reference to FIG. 8, wherein the steps performed by the system are set forth as modules within an exemplary algorithm.

Figure 8:
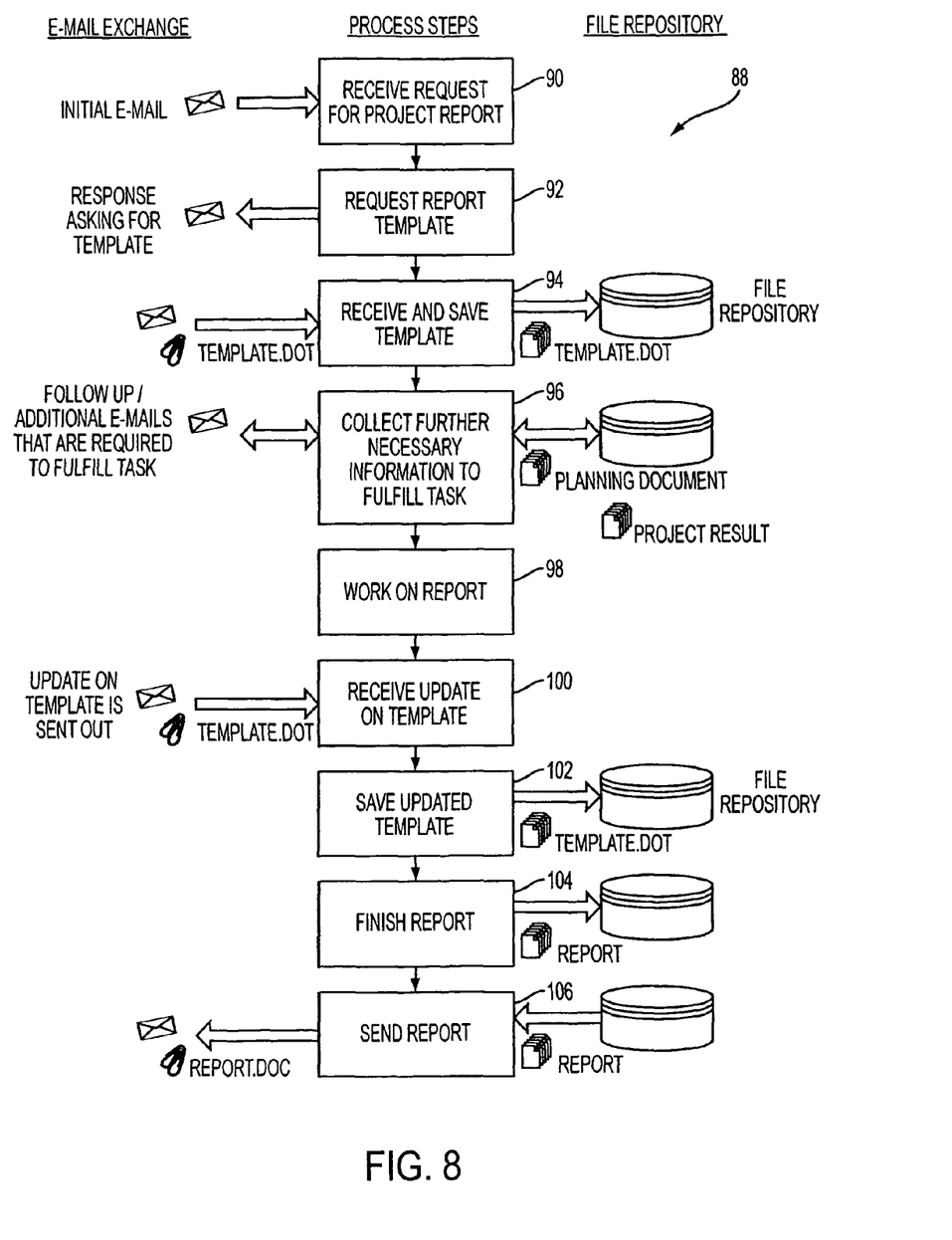
FIG. 8 illustrates a flow diagram of an exemplary method of receiving and processing a task oriented email in another embodiment of the present invention.

FIG. 8 shows an exemplary process 88 enacted by an embodiment of the present system to complete the task of a quarterly report as described above. In module 90 the system receives the initial email requesting a project report from the email exchange server. In module 92 a request is sent for a report template. In module 94 the template is received and stored in the system memory. In module 96 all further information necessary to complete the task is collected. Module 96 may include receiving information from both email and memory sources. In module 98 a system user works on the report. In module 100 updates on the template are received. In module 102 the updates to the template are saved in the system memory. In module 104 the report is finished, and in module 106 the report is sent out.

Figure 9:
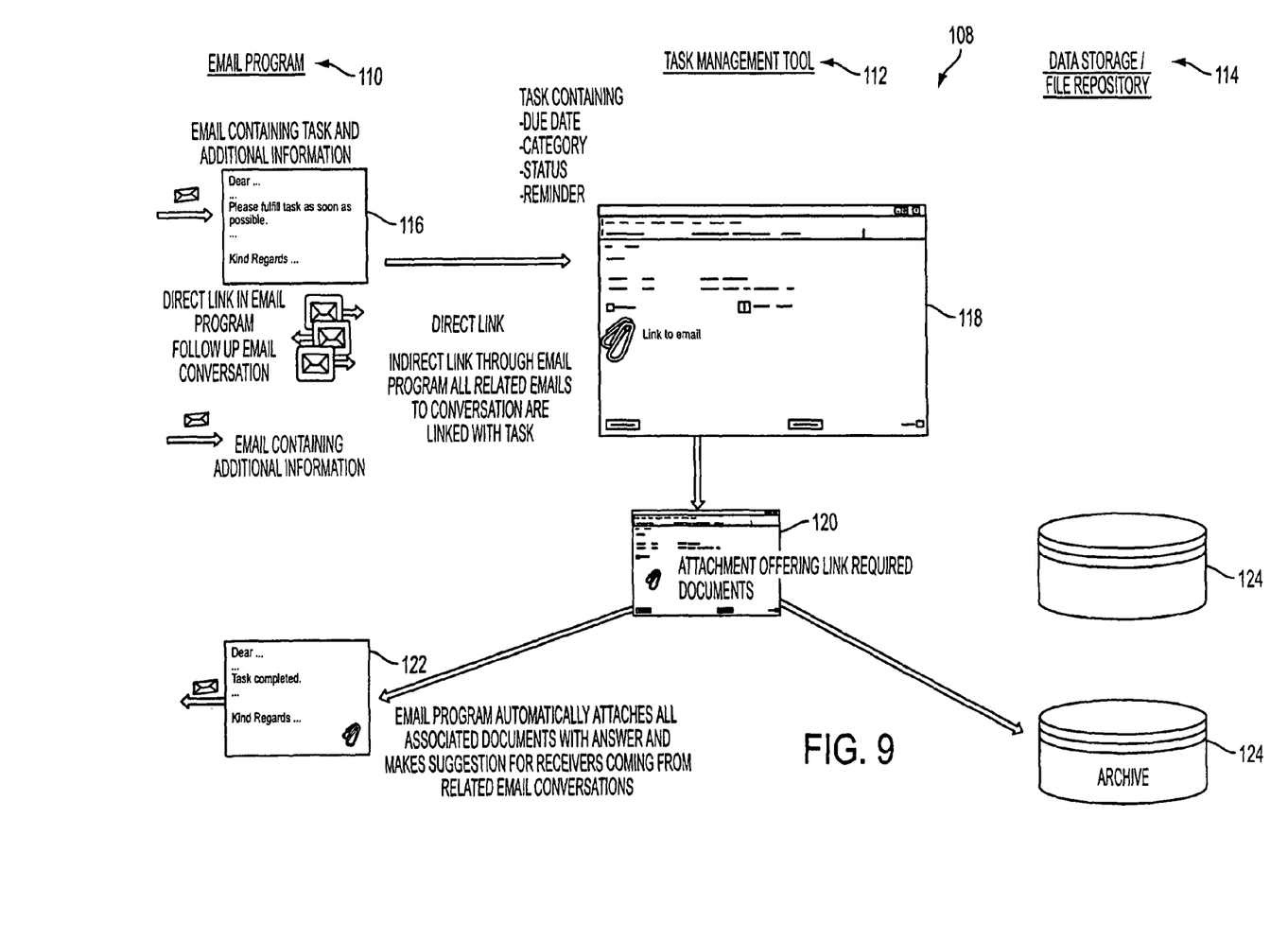
FIG. 9 illustrates another exemplary flow diagram of receiving and processing a task oriented email in one embodiment of the present system.

FIG. 9 shows an exemplary process 108 of the email program 110, the task manager 112 and the system data storage 114 working together in an embodiment of the present system. In this example an email 116 is sent that contains a task to be completed and additional information. This email is received by the task manager 112 where another email 118 is created that contains links to documents that are needed for the tasks. Email 120 is then produced by the task manager 112 and is sent to the system archive 124 and further email 122 is sent to all the required parties.

The task manager 112 stores task management programs therefore enabling a semi-automated task extraction out of the emails. In the example of FIG. 9, the project leader receives an email advising him to deliver a project report about the last quarter. When receiving an email like this that implicitly specifies a task and additional information, the system provides the functionality to populate the task management software with the information out of the email. The recipient can mark sections/text of the email (e.g. through a right-click with the mouse) and define a new task using the selected criteria. In case the email sender provided sufficient information regarding most usual task properties or common metadata is used, the task is created automatically by populating the user interface software, otherwise the user/creator will be prompted for additional information. Instead of dragging an email into a task, this concept enabled the selection of specific parts of an email as tasks properties (e.g. subject, due date, method of work, required information etc.)

A similar solution can be achieved by the sender "marking-up" his email in a special manner so that the recipient's email/task software can automatically create a new task using provided information. This can be realized by embodiments of the system that are user-specific, so that one email sent out, specifies a task for one recipient, but is just a common email for other recipients (e.g. for the above example the request for the project report is sent as a task to the project manager but as simple email to the finance manager).

The task manager 112 also links relevant emails into the task management system and making use of email program features as searching for related emails, email notification, etc. As the above example of FIG. 9 shows, several emails can relate to one task, not only the email specifying the task itself. In this example additional emails contain information from project partners on their work, consumed times, etc. and the project report template that is sent out.

This exemplary embodiment of the task manager 112 therefore links up the task with the original email (eg. as a shortcut) when specifying a task out of an email. This way it is possible to make use of the features of the email program in the task management system. Associated emails (forwarded emails and responses) can be displayed and the information contained in those emails can be retrieved. Furthermore the task management system could display a notification when an additional email arrives that is related to one specified conversation.

The features described above can be used to semi-automatically create a response when a task is finished. As a default, by pressing a button in the task management system for example, an email is created that contains all documents that were added to the task and that is addressed to all persons that were part of an associated email conversation. This way, unnecessary documents can be deleted, rather than all required documents have to be attached manually. The same applies for recipients. The task manager 112 also archives the tasks and all relevant documents as one file. Using the links to related documents and emails, archiving can be simplified. A task can be archived including all related documents and emails. This way it can be retraced afterwards how the task was executed and which information was used.

Figure 10:
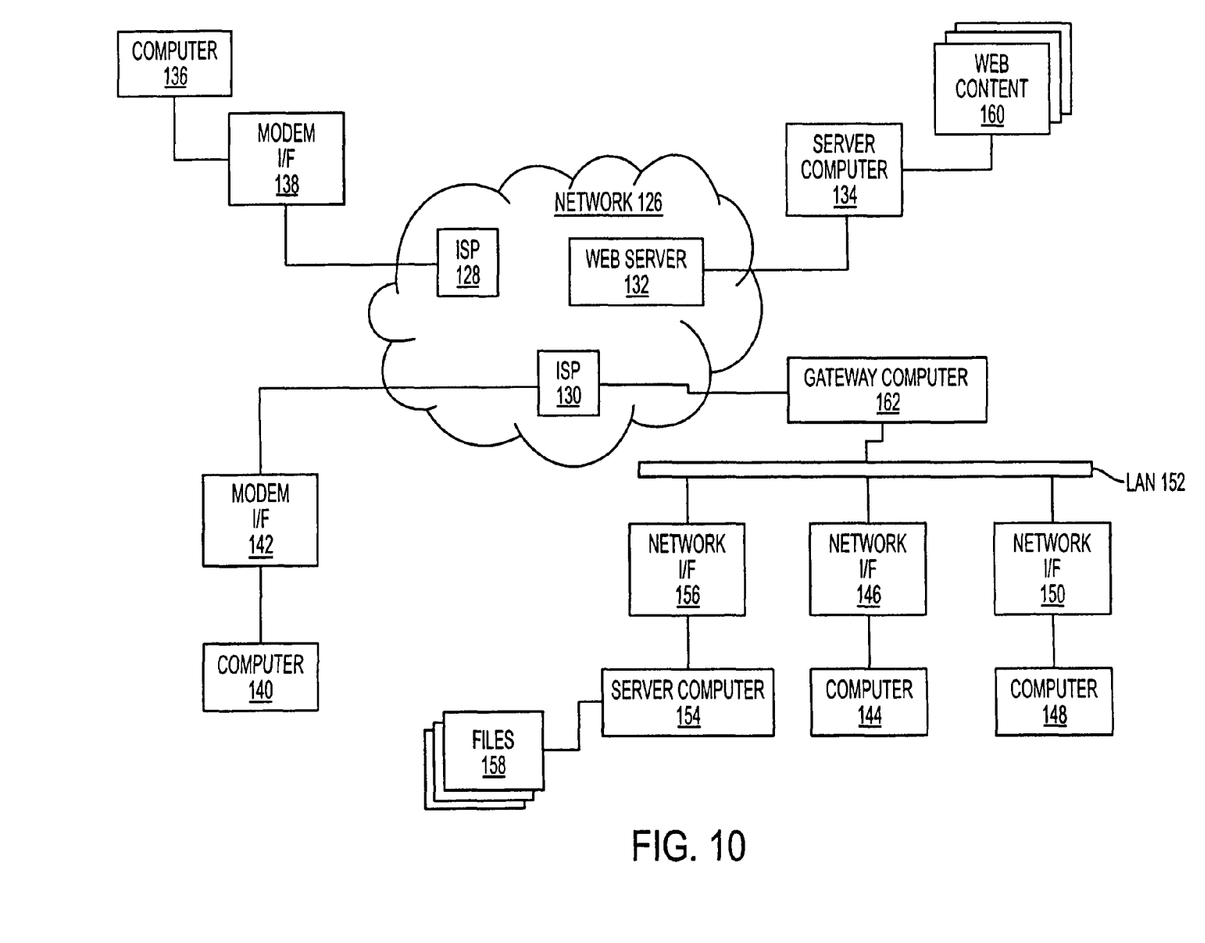
FIG. 10 is a schematic diagram illustrating a computer environment that employs the embodiments of the present system.
Figure 11:
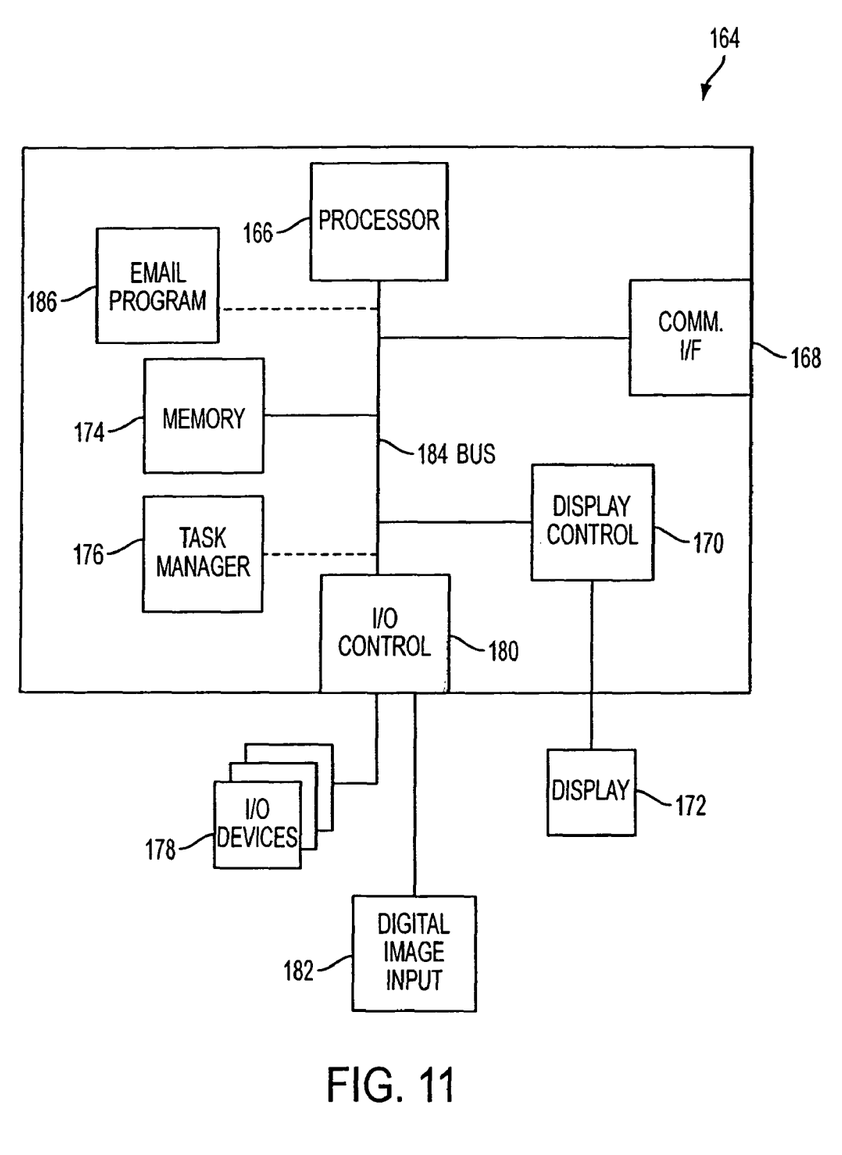
FIG. 11 is a schematic diagram illustrating a computer apparatus that employs and enacts the embodiments of the present system.

The following description of FIGS. 10-11 is intended to provide an overview of computer hardware and other operating components suitable for performing the task management methods of the invention described above, but is not intended to limit the applicable environments. Similarly, the computer hardware and other operating components may be suitable as part of the apparatuses of the invention described above. The invention can be practiced with other computer system configurations, including hand-held devices, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network.

FIG. 10 shows several computer systems that are coupled together through a network 126, such as the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (web). The physical connections of the Internet and the protocols and communication procedures of the Internet are well known to those of skill in the art.

Access to the Internet 126 is typically provided by Internet service providers (ISP), such as the ISPs 128 and 130. Users on client systems, such as client computer systems 136, 140, 144, and 148 obtain access to the Internet through the Internet service providers, such as ISPs 128 and 130. Access to the Internet allows users of the client computer systems to exchange information, receive and send e-mails, and view documents, such as documents which have been prepared in the HTML format. These documents are often provided by web servers, such as web server 132 which is considered to be "on" the Internet. Often these web servers are provided by the ISPs, such as ISP 128, although a computer system can be set up and connected to the Internet without that system also being an ISP.

The web server 132 is typically at least one computer system which operates as a server computer system and is configured to operate with the protocols of the World Wide Web and is coupled to the Internet. Optionally, the web server 132 can be part of an ISP which provides access to the Internet for client systems. The web server 132 is shown coupled to the server computer system 134 which itself is coupled to web content 160, which can be considered a form of a media database. While two computer systems 132 and 134 are shown in FIG. 10, the web server system 132 and the server computer system 134 can be one computer system having different software components providing the web server functionality and the server functionality provided by the server computer system 134 which will be described further below.

Client computer systems 136, 140, 144, and 148 can each, with the appropriate web browsing software, view HTML pages provided by the web server 132. The ISP 128 provides Internet connectivity to the client computer system 136 through the modem interface 138 which can be considered part of the client computer system 136. The client computer system can be a personal computer system, a network computer, a Web TV system, or other such computer system.

Similarly, the ISP 130 provides Internet connectivity for client systems 140, 144, and 148, although as shown in FIG. 10, the connections are not the same for these three computer systems. Client computer system 140 is coupled through a modem interface 142 while client computer systems 144 and 148 are part of a LAN. While FIG. 10 shows the interfaces 138 and 142 as generically as a "modem," each of these interfaces can be an analog modem, ISDN modem, cable modem, satellite transmission interface (e.g. "Direct PC"), or other interfaces for coupling a computer system to other computer systems.

Client computer systems 144 and 148 are coupled to a LAN 152 through network interfaces 146 and 150, which can be Ethernet network or other network interfaces. The LAN 152 is also coupled to a gateway computer system 162 which can provide firewall and other Internet related services for the local area network. This gateway computer system 162 is coupled to the ISP 130 to provide Internet connectivity to the client computer systems 144 and 148. The gateway computer system 162 can be a conventional server computer system. Also, the web server system 132 can be a conventional server computer system.

Alternatively, a server computer system 154 can be directly coupled to the LAN 152 through a network interface 156 to provide files 158 and other services to the clients 144, 148, without the need to connect to the Internet through the gateway system 162.

FIG. 11 shows one example of a conventional computer system 164 that can be used as a client computer system or a server computer system or as a web server system. Such a computer system 164 can be used to perform many of the functions of an Internet service provider, such as ISP 128. The computer system 164 interfaces to external systems through the modem or network interface 168. It will be appreciated that the modem or network interface 168 can be considered to be part of the computer system 164. This interface 168 can be an analog modem, ISDN modem, cable modem, token ring interface, satellite transmission interface (e.g. "Direct PC"), or other interfaces for coupling a computer system to other computer systems. The computer system 164 includes a processor 166, which can be a conventional microprocessor such as an Intel Pentium microprocessor or Motorola Power PC microprocessor. Memory 174 is coupled to the processor 166 by a bus 184.

Memory 174 can be dynamic random access memory (DRAM) and can also include static RAM (SRAM). The bus 184 couples the processor 166 to the memory 174, to display controller 170, and to the input/output (I/O) controller 180.

The display controller 170 controls in the conventional manner a display on a display device 172 which can be a cathode ray tube (CRT) or liquid crystal display (LCD). The input/output devices 178 can include a keyboard, disk drives, printers, a scanner, and other input and output devices, including a mouse or other pointing device. The display controller 170 and the I/O controller 180 can be implemented with conventional well known technology. A digital image input device 178 can be a digital camera which is coupled to an I/O controller 180 in order to allow images from the digital camera to be input into the computer system 164.

The task manager 176 stores the task management programs and works in conjunction with the email programs as stored in 186 and the processor 166. As is well known in the art, the task manager programs 176 and email programs 186 may be stored in the computer system 164, partially stored in the computer system, or externally stored. The programs contained in modules 176 and 186 are software processes that run on conventional hardware devices such as the processor 166. As described above, the data and documents linked and stored in the database, would be written by a direct memory access process, into memory 174 during execution of software in the computer system 164. One of skill in the art will immediately recognize that the terms "machine-readable medium" or "computer-readable medium" includes any type of storage device that is accessible by the processor 166 and also encompasses a carrier wave that encodes a data signal.

The computer system 164 is one example of many possible computer systems which have different architectures. For example, personal computers based on an Intel microprocessor often have multiple buses, one of which can be an input/output (I/O) bus for the peripherals and one that directly connects the processor 166 and the memory 174 (often referred to as a memory bus). The buses are connected together through bridge components that perform any necessary translation due to differing bus protocols.

Network computers are another type of computer system that can be used with the present invention. Network computers do not usually include a hard disk or other mass storage, and the executable programs are loaded from a network connection into the memory 174 for execution by the processor 166. A Web TV system, which is known in the art, is also considered to be a computer system according to the present invention, but it may lack some of the features shown in FIG. 11, such as certain input or output devices. A typical computer system will usually include at least a processor, memory, and a bus coupling the memory to the processor.

In addition, the computer system 164 is controlled by operating system software which includes a file management system, such as a disk operating system, which is part of the operating system software. One example of an operating system software with its associated file management system software is the family of operating systems known as Windows® from Microsoft Corporation of Redmond, Wash., and their associated file management systems. Another example of an operating system software with its associated file management system software is the LINUX operating system and its associated file management system. The file management system is typically stored in the memory 174 as described above. These stored programs cause the processor 166 to execute various acts in order to input and output data and to store data in memory, including storing files and interacting with the stored email programs 186 and interacting with stored task management programs and the processing within the task manager 176 to perform the modules as described above.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention, in some embodiments, also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language, and various embodiments may thus be implemented using a variety of programming languages.

The systems described are therefore capable of enabling the methods described herein regarding the integration of email and task management features to arrive at an expanded solution to task completion within a computer environment.

One skilled in the art will appreciate that although specific embodiments of the communications system have been described for purposes of illustration, various modifications can be made without deviating from the spirit and scope of the present invention. For example, the present invention may be applied to many different types of databases and systems that employ different types of email and task management application programs. Accordingly, the invention is described by the appended claims.

What is claimed is:

1. A computer-implemented method, the method comprising:
   receiving, from a sender, a task oriented email, the task oriented email including an indication of a task, the indication being defined by the sender;
   identifying the task based on the indication;
   determining, based on user input, that the task should be created and the task oriented email integrated into a computer system;
   creating the task within the computer system from the task oriented email, wherein creating the task initiates a conversation;
   storing a task entry for the conversation in a database of the computer system, wherein the task entry includes:
      links to emails associated with the task,
      one or more links to documents associated with the task, and
      task data values that include a deadline for the task;
   integrating the task oriented email within the computer system;
   generating a link to the task oriented email as part of the conversation;
   receiving a second task oriented email associated with the task;
   generating a second link to the second task oriented email;
   updating the conversation to include the second link to the second task oriented email;
   determining participants of the conversation;
   detecting that the task is completed; and
   responsive to the detecting, creating a response email to the participants.

2. The computer-implemented method of claim 1, the method further comprising querying a user to determine whether the task oriented email is to be integrated into the computer system.

3. The computer-implemented method of claim 2, wherein generating the link to the task oriented email as part of the conversation comprises creating a shortcut to the task oriented email from the computer system.

4. The computer-implemented method of claim 1, the method further comprising updating the task oriented email with completed task information.

5. The computer-implemented method of claim 1, the method further comprising generating a third link to a document associated with the task.

6. A computer-implemented method, wherein a computer system includes a processor, a database, and a task manager, the method comprising:
   receiving, from a sender, a task oriented email, the task oriented email including an indication of a task, the indication being defined by the sender;
   extracting the task from the task oriented email, wherein extracting the task initiates a conversation;
   storing a task entry for the conversation in the database, wherein the task entry includes:
      links to emails associated with the task,
      one or more links to documents associated with the task, and
      task data values that include a deadline for the task,
   linking the task manager with a plurality of task oriented emails being related to the task;

providing a user with shortcuts to documents stored in the database, the documents relating to the task, the shortcuts being accessed via the task manager;

archiving the task and the related documents into the database;

determining participants of the conversation;

detecting that the task is completed; and responsive to the detecting, creating a response email to the participants.

7. The computer-implemented method of claim 6, wherein the related documents are to be automatically updated.

8. The computer-implemented method of claim 6, wherein the task is to be completed by a plurality of users.

9. An apparatus comprising:

a processor;

a database;

a task manager for extracting and integrating a task within a plurality of task oriented emails, received from at least one sender, with the processor and the database for distribution and completion, the plurality of task oriented emails each including an indication of a task, the indication being defined by the sender, wherein the task is associated with links to documents related to the task and stored in the database, the task manager for linking to each of the plurality of task oriented emails, wherein a conversation is defined for the task and includes the plurality of task oriented emails, the task manager to:

store a task entry for the conversation in the database, wherein the task entry includes:

links to emails associated with the task, one or more links to documents associated with the task, and task data values that include a deadline for the task;

determine participants of the conversation, detect that the task is completed, and responsive to the detecting, create a response email to the participants; and a display to display the conversation between a plurality of computer users relating to the task.

10. The computer-implemented method of claim 1, wherein the task is related to one or more activities to be completed.

11. The computer-implemented method of claim 1, wherein the task is related to completion of a report.

12. The computer-implemented method of claim 1, wherein the indication of a task includes markings by the sender, the markings indicating that the task oriented email includes the task.

13. The computer-implemented method of claim 1, the method further comprising extracting information being related to the task from the task oriented email.

14. The computer-implemented method of claim 1, the method further comprising:

selecting information included in the task oriented email as properties of the task; and associating the task with the properties.

15. The computer-implemented method of claim 14, wherein the properties include one or more of a subject of the task oriented email, due date for completion of the task, a method of performance of the task, and a name of a project associated with the task.

16. The computer-implemented method of claim 14, the method further comprising providing additional links to the properties of the task.

17. The computer-implemented method of claim 14, the method further comprising updating the properties when the email oriented email is modified.

18. The computer-implemented method of claim 17, the method further comprising sending an email notification of an update to the task.

19. A computer-readable medium comprising instructions, which when executed by one or more processors, perform the following operations:

receive, from a sender, a task oriented email, the task oriented email including an indication of a task, the indication being defined by the sender;

identify the task based on the indication;

determine, based on user input, that the task should be created and the task oriented email integrated into a computer system;

create the task within the computer system from the task oriented email, wherein the operation to create the task initiates a conversation;

store a task entry for the conversation in a database of the computer system, wherein the task entry includes:

links to emails associated with the task, one or more links to documents associated with the task, and task data values that include a deadline for the task;

integrate the task oriented email within the computer system;

generate a link to the task oriented email as part of the conversation;

receive a second task oriented email associated with the task;

generate a second link to the second task oriented email;

update the conversation to include the second link to the second task oriented email;

determine participants of the conversation;

detect that the task is completed; and responsive to the detection, create a response email to the participants.

* * * * *